United States Patent
Mishra et al.

(10) Patent No.: US 10,050,749 B2
(45) Date of Patent: Aug. 14, 2018

(54) VIDEO CONFERENCE BRIDGE SETTING SHARING, PUSHING, AND RATIONALIZATION

(71) Applicant: Avaya Inc., Santa Clara, CA (US)

(72) Inventors: Amit Mishra, Pune (IN); Srinivasan Narayanan, Pune (IN); Anand Paithankar, Nanded (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/702,238

(22) Filed: Sep. 12, 2017

(65) Prior Publication Data

US 2018/0006772 A1 Jan. 4, 2018

Related U.S. Application Data

(62) Division of application No. 13/103,230, filed on May 9, 2011, now Pat. No. 8,619,949, and a division of
(Continued)

(51) Int. Cl.
*H04L 1/18* (2006.01)
*G06F 11/14* (2006.01)
(Continued)

(52) U.S. Cl.
CPC ........ *H04L 1/1867* (2013.01); *G06F 11/1443* (2013.01); *H04L 12/1818* (2013.01); *H04L 65/1069* (2013.01); *H04L 65/403* (2013.01); *H04L 65/80* (2013.01); *H04M 3/567* (2013.01); *H04N 7/15* (2013.01)

(58) Field of Classification Search
CPC combination set(s) only.
See application file for complete search history.

(56) References Cited

U.S. PATENT DOCUMENTS 5,594,725 A 1/1997 Tischler et al.
5,764,278 A 6/1998 Nagao
(Continued)

FOREIGN PATENT DOCUMENTS

GB 2446191 8/2008
JP 10-200639 4/1998
(Continued)

OTHER PUBLICATIONS

Schulzrinne et al. "RTP: A Transport Protocol for Real-Time Applications," Internet Engineering Task Force Network Working Group, RFC 3550, Jul. 2003, 98 pages.
(Continued)

*Primary Examiner* — Joseph J Nguyen
(74) *Attorney, Agent, or Firm* — Sheridan Ross P.C.

(57) ABSTRACT

A conference system is provided with enhanced settings capabilities. A controller can poll for settings at each endpoint in a conference system and be able via the video stream to selectively display and compare settings among the endpoints. One location can push its settings to one or more locations to overcome failures or degradation in the conference. The settings between different controllers may be rationalized via a common denominator method or tabular method to build a knowledge of how to configure conferences and to automate responses to problems.

20 Claims, 8 Drawing Sheets

Related U.S. Application Data application No. 14/085,506, filed on Nov. 20, 2013, now Pat. No. 9,787,441.

(51) Int. Cl.

| | | |
|---|---|---|
| *H04L 12/18* | (2006.01) | |
| *H04M 3/56* | (2006.01) | |
| *H04L 29/06* | (2006.01) | |
| *H04N 7/15* | (2006.01) | |

(56) References Cited

U.S. PATENT DOCUMENTS

| | | | |
|---|---|---|---|
| 5,841,763 | A | 11/1998 | Leondires et al. |
| 8,619,949 | B2 | 12/2013 | Mishra et al. |
| 9,787,441 | B2 | 10/2017 | Mishra et al. |
| 2004/0022202 | A1 | 2/2004 | Yang et al. |
| 2004/0203977 | A1 | 10/2004 | Kennedy |
| 2005/0013309 | A1 | 1/2005 | Ravishankar et al. |
| 2005/0201303 | A1 | 9/2005 | Oliveira et al. |
| 2005/0233736 | A1 | 10/2005 | Berstis et al. |
| 2006/0159099 | A1 | 7/2006 | Hensley |
| 2006/0248144 | A1 | 11/2006 | Zhu et al. |
| 2006/0293073 | A1 | 12/2006 | Rengaraju et al. |
| 2007/0133413 | A1* | 6/2007 | Pepperell ............... H04L 12/18 370/235 |
| 2007/0206089 | A1* | 9/2007 | Eshkoli ............... H04L 12/1822 348/14.02 |
| 2008/0037746 | A1 | 2/2008 | Dufrene et al. |
| 2008/0068448 | A1 | 3/2008 | Hansen |
| 2008/0069328 | A1 | 3/2008 | Bostick et al. |
| 2008/0077666 | A1 | 3/2008 | Sekaran et al. |
| 2008/0183818 | A1 | 7/2008 | Farshchi et al. |
| 2008/0246834 | A1 | 10/2008 | Lunde et al. |
| 2010/0027775 | A1 | 2/2010 | I'Anson |
| 2012/0243673 | A1 | 9/2012 | Carr et al. |
| 2012/0275349 | A1* | 11/2012 | Boyer ............... H04L 12/1822 370/261 |

FOREIGN PATENT DOCUMENTS

| | | |
|---|---|---|
| JP | 2000-023131 | 1/2000 |
| JP | 2003-258776 | 9/2003 |
| JP | 2009-232015 | 10/2009 |
| WO | WO 01/52513 | 7/2001 |
| WO | WO 02/093397 | 11/2002 |
| WO | WO 2006/036259 | 4/2006 |

OTHER PUBLICATIONS

Search Report for United Kingdom Patent Application No. GB1122374.0, dated May 1, 2012 8 pages.
Search Report for United Kingdom Patent Application No. GB1311365.9, dated Dec. 13, 2013 6 pages.
Search Report for United Kingdom Patent Application No. GB1311369.1, dated Dec. 13, 2013 5 pages.
Official Action with English Translation for Japan Patent Application No. 2012-023855, dated Nov. 29, 2013 6 pages.
Official Action for U.S. Appl. No. 13/103,230, dated Apr. 3, 2013, 9 pages.
Notice of Allowance for U.S. Appl. No. 13/103,230, dated Aug. 21, 2013, 6 pages.
Official Action for U.S. Appl. No. 14/085,506, dated Mar. 18, 2016, 8 pages (Restriction Requirement).
Official Action for U.S. Appl. No. 14/085,506, dated May 31, 2016, 7 pages.
Official Action for U.S. Appl. No. 14/085,506, dated Sep. 15, 2016, 11 pages.
Official Action for U.S. Appl. No. 14/085,506, dated Nov. 23, 2016, 13 pages.
Notice of Allowance for U.S. Appl. No. 14/085,506, dated Jun. 8, 2017, 12 pages.

* cited by examiner

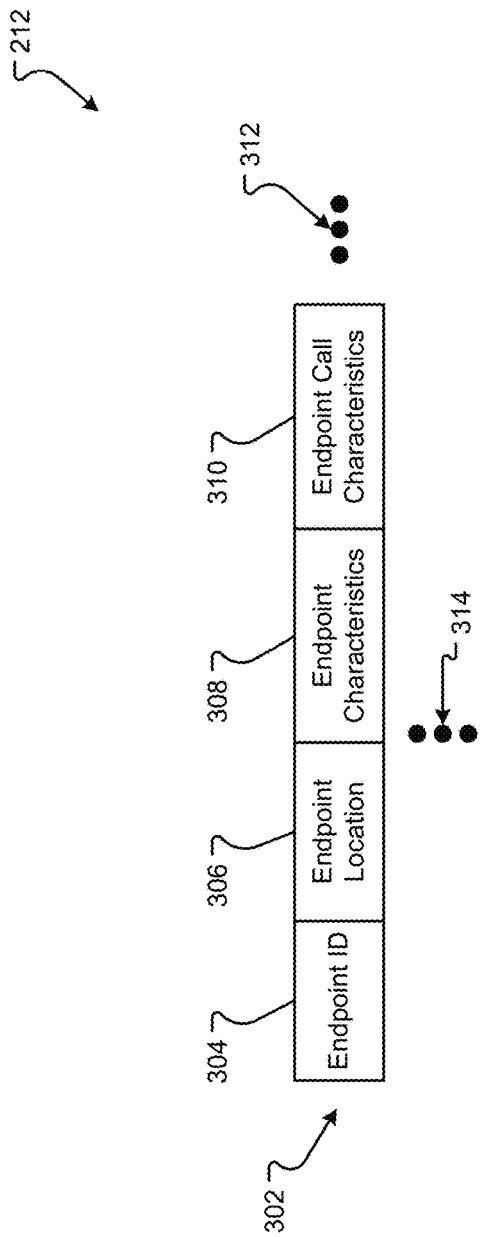
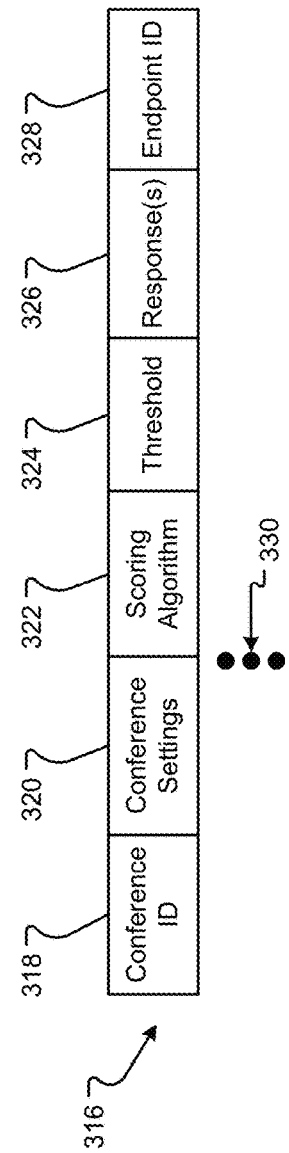
Fig. 3A
Fig. 3B

VIDEO CONFERENCE BRIDGE SETTING SHARING, PUSHING, AND RATIONALIZATION

CROSS REFERENCE TO RELATED APPLICATION

The presented application is a divisional of U.S. patent application Ser. No. 14/085,506, filed Nov. 20, 2013, which is a divisional of U.S. patent application Ser. No. 13/103,230, filed May 9, 2011, the contents of which are incorporated herein by reference in its entirety.

BACKGROUND

Video conferencing and teleconferencing provide communications capabilities to many organizations. The systems that provide conferencing capabilities can connect several endpoints into calls. However, a problem exists when multiple locations can have different conference settings and one or more locations are having trouble determining the cause of a problem. Generally, it can be difficult to determine what the settings are at each conference location. Typically, any problems with the conference must be resolved via verbal exchanges. Generally, there is no automated facility to diagnose and resolve conferencing issues.

SUMMARY

It is with respect to the above issues and other problems that the embodiments presented herein were contemplated. Embodiments described in the present application provide a system and method for providing or establishing settings for a conference. A multipoint control unit (MCU) can provide default settings to a communication endpoint when the communication endpoint first requests a conference. After setting up the conference, the MCU can monitor the conference to determine if the conference conditions change. If a failure in a communication endpoint occurs, the MCU can provide the already established settings to the communication endpoint when the communication endpoint rejoins the conference. If the quality of the conference changes, the MCU can monitor and readjust the settings of the communication endpoints to compensate for the changes to the conference. Further, the MCUs can exchange information about conference settings and communication endpoints to create a knowledge base for configuring conferences under certain circumstances.

The embodiments provide a unique system and method for polling for settings at each endpoint and be able, via the video stream or a second control stream, to selectively display and compare settings between what exists at the endpoint and what is understood and pushed by the MCU. Further, one location can push its settings to one or more locations. The settings between different controllers may be rationalized via a common denominator method or tabular method.

The term "conference" as used herein refers to any communication or set of communications, whether including audio, video, text, or other multimedia data, between two or more communication endpoints and/or users. Typically, a conference includes three or more communication endpoints.

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc. In embodiments, the communication endpoint is a computer system as described in conjunction with FIGS. 7 and 8.

The term "multipoint control unit (MCU)" as used herein refers to any hardware, software, or a combination of hardware and software operable to conduct, manage, execute, or otherwise hold a conference between two or more communication endpoints and/or one or more other MCUs. The MCU may be a server or computer system as described in conjunction with FIGS. 7 and 8. The MCU can be a part of a conference bridge used to conduct conferences.

The term "settings" as used herein refers to any configuration or characteristic of a MCU and/or communication endpoint. Settings can include static characteristics that do not change or dynamic characteristics that may vary depending on the configuration of the conference. An example of static setting may be the IP address of the communication endpoint. An example of a dynamic setting can be the codec used during a conference by the communication endpoint.

The term "conference engine" as used herein refers to a module executed by a MCU to establish and/or conduct a conference.

The term "RTCP" as used herein refers to Real-Time Transport Control Protocol. RTCP is as described in Real-Time Transport Protocol (RTP) specification RFC 3550, dated July 2003, by Schulzrinne et al., available from the Internet Engineering Task Force (IETF) Network Working Group; this document and all other documents describing RTCP are herein incorporated by reference in their entirety for all that they teach. RTCP provides statistics and control information associated with RTP. RTCP help deliver "metadata" about the multimedia being transported by RTP. RTCP messages can be sent over separate ports from the RTP packets. RTCP generally provides feedback about the quality of service (QoS) to the participants in a conference.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIGS. 6 and 7. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "database" or "data model" as used herein refers to any system, hardware, software, memory, storage device, firmware, component, etc., that stores data. The data model can be any type of database or storage framework described in conjunction with FIGS. 6 and 7, which is stored on any type of non-transitory, tangible computer readable medium. The data model can include one or more data structures, which may comprise one or more sections that store an item of data. A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" or "computer program product" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures:

FIGS. 3A and 3B are embodiments of a data model operable to store settings information for one or more conferences and/or one or more communication endpoints;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
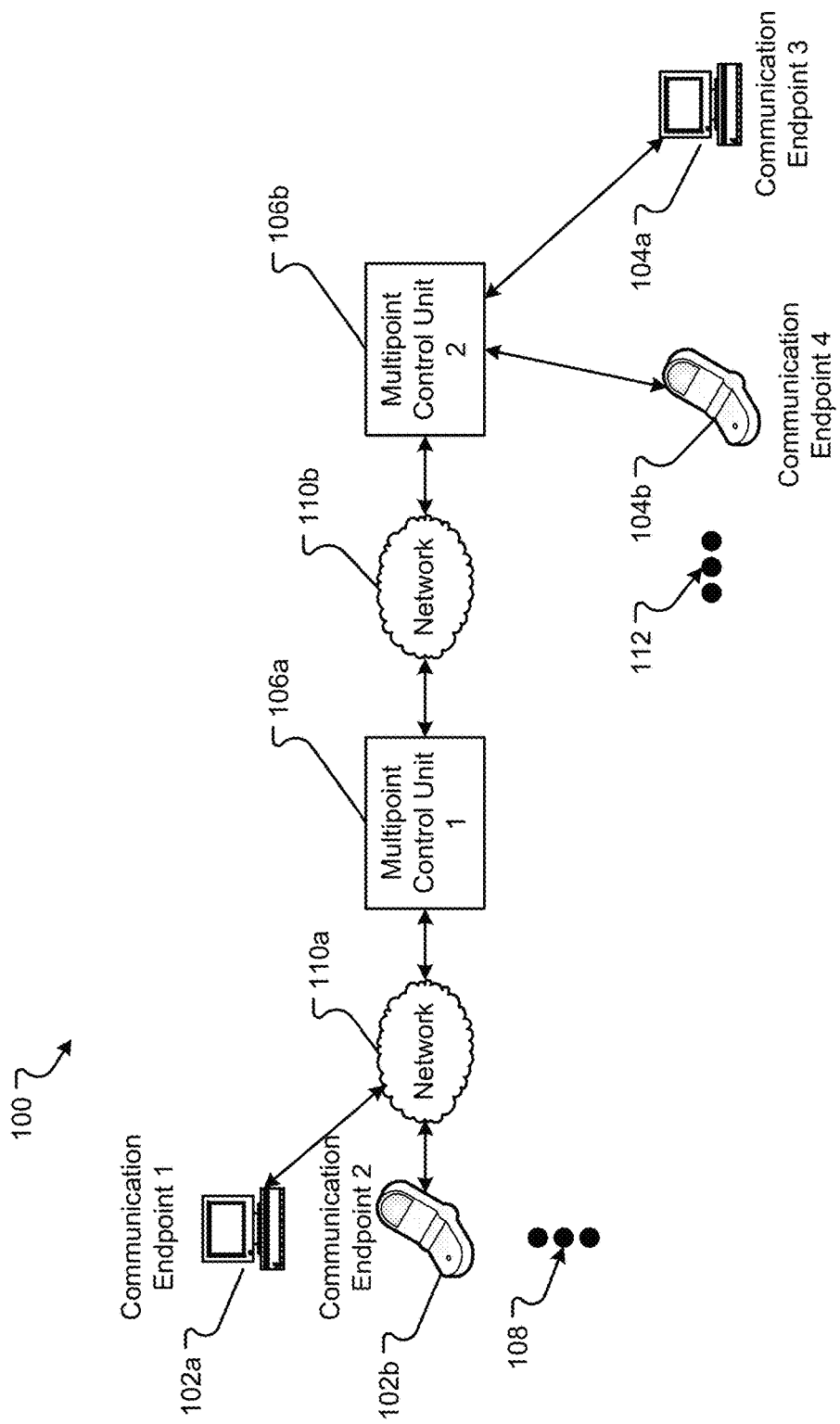
FIG. 1 is a block diagram of an embodiment of a system for conducting a conference.

An embodiment of a system 100 for conducting a conference is shown in FIG. 1. The system 100 can include two or more MCUs, such as, MCU 1 106a and MCU 2 106b. The MCUs 106 can be in communication with one or more communication endpoints 102a, 102b, 104a, and/or 104b. For example, MCU 1 106a can be in communication with communication endpoint 1 102A and/or communication endpoint 2 102B. There may be more or fewer communication endpoints 102 in communication with MCU 1 106a than those shown in FIG. 1, as represented by ellipses 108. Likewise, MCU 2 106b can be in communication with communication endpoint 3 104a and communication endpoint 4 104b. MCU 2 106b can be in communication with more or fewer communication endpoints than those shown in FIG. 1, as represented by ellipses 112.

The communication endpoints 102 or 104 can communicate with the MCUs 106 through one or more networks 110. The networks 110 can represent local area networks (LAN), wide area networks (WAN), public switched telephone network, the Internet, other types of data or telephony networks, or other networks capable of communicating data bi-directionally between the communication endpoints 102 and the MCUs 106. Further, the MCUs 106 can communicate with each other through a network 110b.

Figure 2:
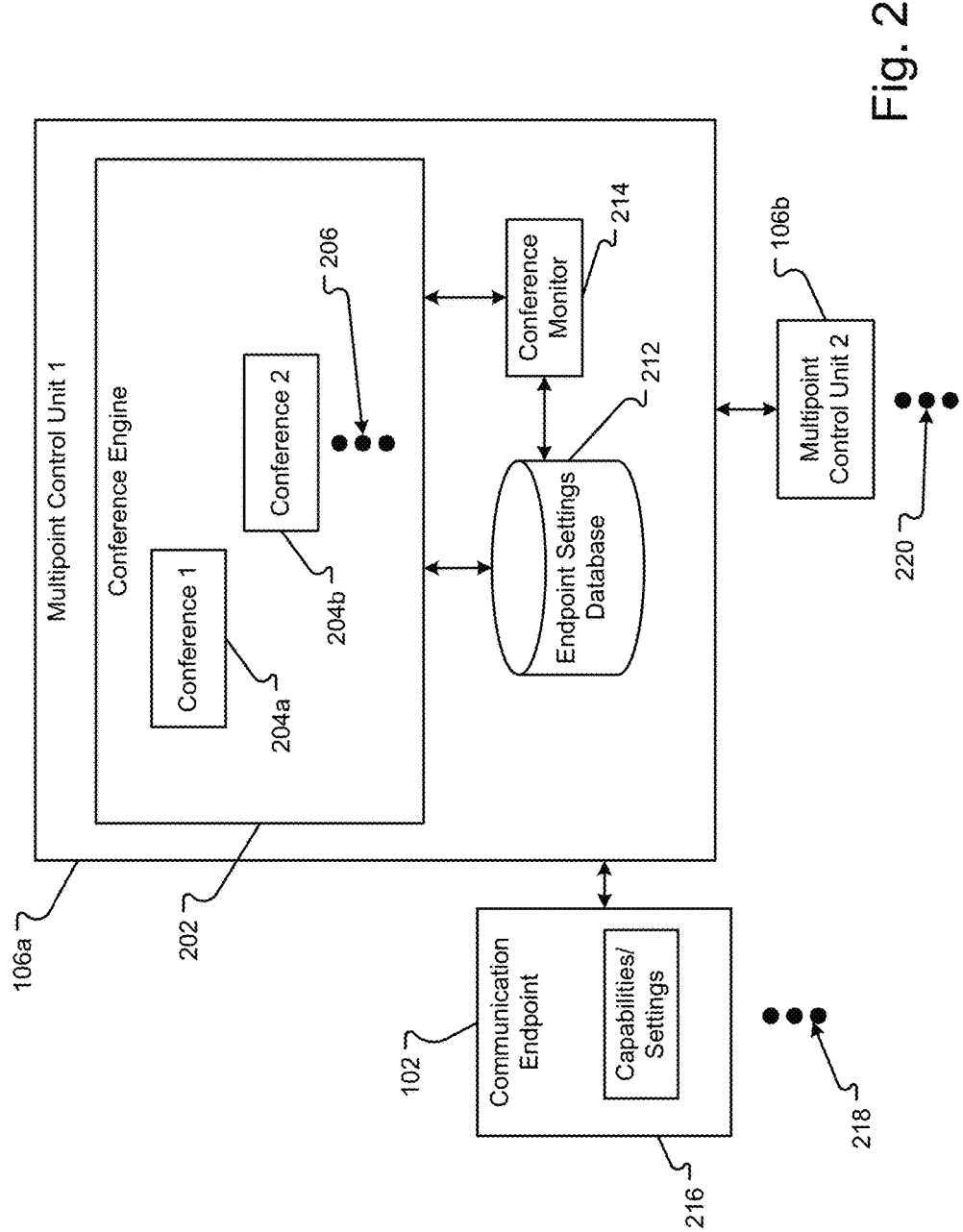
FIG. 2 is a block diagram of an embodiment of a MCU operable to conduct a conference.

An embodiment of a MCU 106 is shown in FIG. 2. The MCU 106a can execute one or more modules, which may be hardware and/or software, to conduct a conference. The MCU 106 can execute a conference engine 202, which may conduct one or more conferences 204a or 204b. For example, conference engine 202 conducts conference 1 204a and conference 2 204b. The conference engine 202 can conduct more or fewer conferences than those shown in FIG. 2, as represented by ellipses 206. The conference engine 202 is operable to initialize conferences as communication endpoints 102 can call into a conference 204. The conference engine 202 can also link two or more communication endpoints 102 in a conference 204 to transfer data between the two communication endpoints 102 during the conference 204. Thus, the conference engine 202 can receive and broadcast data with and amongst the communication endpoints 102. The conference can include one or more communication endpoints 102, as represented by ellipses 218.

To establish a conference, the conference engine 202 communicates with other conference engines. The conference engine 202 is operable to initialize and conduct the conference with a second MCU 106b and/or communication endpoints 102. Thus, the conference engine 202 is operable to create a link line through a network 110 to exchange data (e.g., audio data, video data, or other multimedia data) with other MCUs, e.g., MCU 2 106b, and/or communication endpoints 102. Data received from the second MCU 106b by the conference engine 202 is then distributed as part of the conference 204. Thus, audio data, video data, or other data received from the MCU 106b can be communicated through the conference engine 202 to the communication endpoints 102 that are part of the conference 204.

The MCU 106a can also include a conference monitor module 214. The conference monitor 214 can monitor one or more of the conferences 204 being conducted by the conference engine 202. The conference monitor can measure quality of service (QOS) statistics. The measurements of the QOS statistics can include measurements of packet delay, jitter, or other types of QOS measures, which may be developed using RTCP or other proprietary mechanisms. The QOS statistics can measure the quality of the communications between MCUs or between a MCU and a communication endpoint 102/104. In embodiments, the conference monitor 214 can receive reports over the RTCP connection between either the MCU 106a and one or more other MCUs 106B or between the MCU 106A and the communication endpoint 102. This measured information may be compared, by the conference monitor 214, to a threshold to determine if the QOS measures are meeting a certain predetermined standard for the conference 204. The determination or measurements may be provided to the conference engine 202 to determine if changes to the conference 204 need to be made. The QOS data may be transported by and between quality monitoring applications executed by the conference engines 202 of the MCUs 106 using RTCP or other proprietary signaling over transport control protocol (TCP)/User Datagram Protocol (UDP).

A capabilities/settings application 216 can be executed by the communication endpoint 102a. The capability/settings application 216 may be operable to provide information to the MCU 106 or request settings from the MCU 106. Thus, when a communication endpoint 102 begins a conference 204, with the MCU 106, the communication endpoint 102 can request settings from the MCU 106 and send the communication endpoint's capabilities to the MCU 106. The settings can include a network setting, a communication endpoint setting, or a conference engine setting. The capability/settings application 216 may then receive the settings and store those settings at the communication endpoint 102 for an upcoming conference 204. In alternative embodiments, the determination of the MCU 106 settings and publishing the settings can occur ad-hoc at any time during the conference.

Further embodiments, the MCU 106 can also include an endpoint settings database 212. The endpoint settings database 212 can be any database as described in conjunction with FIGS. 7 and 8. In embodiments, the endpoint settings database 212 stores all information about settings for one or more endpoints 102 involved in one or more conferences 204. Further, the endpoint settings database 212 may store archived information about endpoints 102 that were previously involved in a conference 204. This archived information can be indexed by the endpoint 102 and/or the conference 204. During conferences, the MCUs 106 can exchange information, through reports communication by RTCP or via a proprietary protocol, about communication endpoints 102 in communication with the MCUs 106. The exchanged information may be indexed in the endpoints settings database 212 by the conference and/or the communication endpoint 102. Also, the endpoint settings database 212 may also provide the endpoint settings to a communication endpoint 102 or to the conference engine 202 for use in establishing conferences. An example of an endpoint settings database is as described in conjunction with FIG. 3.

An example of the endpoint settings database 212 for storing settings information for conferences 204 is shown in FIGS. 3A and 3B. The endpoint settings database 212 shown in FIGS. 3A and 3B may include one or more data structures. For example, the endpoint settings database 212 can include a first data structure 302 and a second data structure 316 shown separately in FIGS. 3A and 3B respectively. The data structures 302 and 316 may include one or more portions that store information. Each portion may store one or more items of information.

In embodiments, the data structure 302 includes sections for an endpoint identifier 304, endpoint location 306, endpoint characteristics 308, and/or endpoint call characteristics 310. The data structure 302 can include more or fewer fields than that show in FIG. 3A, as represented by ellipses 312. Further, data structure 302 can be associated with a single endpoint. As such, there may be more data structures 302 than that shown in FIG. 3A, as represented by ellipses 314. An endpoint identifier 304 can include any identifier (ID) that can uniquely identify a communication endpoint 102. For example, the endpoint ID 304 can be a globally unique identifier (GUID), a telephone number, an IP address, model number, manufacturer, MAC address, or some other type of identifier. The endpoint ID 304 uniquely identifies the data structure 302 from other data structures associated with other endpoints 102.

An endpoint location 306 can identify the physical or logical location of the communication endpoint 102. For example, the endpoint location 306 can be a physical address (e.g., 13456 Main St.), a latitude and longitude, or other location information designating where the communication endpoint 102 is physically located. In other examples, the endpoint location 306 can be a subnet address or some other identifier for the network location for the communication endpoint 102. The endpoint location 306 can be an indicator for how to adjust the conference based on the physical distance between the communication endpoint 102 and the MCU 106. Longer physical distances can cause certain changes to conference quality.

Endpoint characteristics 308 can include one or more characteristics describing the communication endpoint 102. These communication endpoint characteristics 308 may include information about which capabilities the communication endpoint 102 is capable. For example, the endpoint characteristics 308 may include the one or more coders/decoders (codecs) for which the communication endpoint 102 can execute. Any information about how a communication endpoint 102 can conduct a conference can be included in the endpoint characteristics 308.

The endpoint call characteristics 310 can describe information about one or more conferences 204 in which the communication endpoint 102 was either previously involved or is currently involved. The endpoint call characteristics 310 can include information about the settings for the conference. The settings information may be used to configure future conferences to provide the best chance of good QOS characteristics. For example, the type of codec used by the communication endpoint 102 for the conference may be selected in a manner that is similar to previously successful conferences 204 with that communication endpoint 102. The previous conferences 204 may likely have the same call characteristics and, thus, provide a roadmap for how to conduct the conference 204 with the communication endpoint 102. For example, if the communication endpoint is physically separated from the MCU 106, the type of codec used may be changed in order to adjust for packet delay and other QOS issues. The endpoint call characteristics 310 can also be a collection of quality metrics received during the conference 204, which may be stored with the data structure 302 as a record of previous conferences 204.

A second data structure 316 can store settings for a conference 204. There may be a data structure 316 associated with each conference 204 conducted by the conference engine 202. There may be more conference data structures 316 than that shown in FIG. 3B, as represented by ellipses 330. The data structure 316 can include one or more portions that can each include one or more items of data. The data may include a conference ID 318, conference settings 320, scoring algorithm 322, threshold 324, one or more responses 326, and/or one or more endpoint identifiers 328. The data structure 316 can include one or more other portions or may include fewer portions, as represented by ellipses 330.

The conference ID 318 can be an ID that identifies a conference 204 uniquely from all other conferences 204. The conference ID 318 can include a GUID, a conference pass code, a telephone number for the conference, or some other identifier that identifies a conference. This conference ID 318 can be used to locate the used conference settings in the future. Conference settings 320 can include all the configuration information for the conference 204. Configuration information can include which codecs were used by the communication endpoints 102, the delay or other information from an quality report, information about which communication endpoints 102 (and the communication endpoints' characteristics) are involved in the conference 204, etc. The conference settings information 320 can be provided to assist in configuring further conferences. The data stored by the MCU and associated with FIGS. 3A and 3B may be archived against a device, whether the data is determined by the MCU 106 or communicated from another device and received by the MCU 106. Thereinafter, the data can be used to extrapolate settings for the device based on a normalization scheme between the MCUs 106. In alternative embodiments, at least a portion of the data associated with FIGS. 3A and 3B may be archived in one or more of the communication endpoints 102/104. The settings used in a conference having certain properties can teach an MCU 106 how to configure devices, such as endpoints 102, for a conference. Thus, in the future, an MCU 106 can determine what settings to use as defaults for a device based on the last, best configuration for a past conference with similar or the same characteristics.

A scoring algorithm 322 can include a predetermined algorithm to be presented to the conference monitor 214 to monitor one or more conferences 204. The scoring algorithm 322 can be user created, can be automatic, or a combination where a user may assign weights assigned to certain criteria of the QOS measures used in an automatic algorithm. The scoring algorithm 322 may also generate a algorithmic score from available information, for example, from 1 to 10, 10 being the highest, where if a score drops below a certain number the conference settings 320 can be changed by the conference engine 202. The algorithmic score can be compared to a threshold 324. As such, the threshold portion 324 stores a threshold, which when crossed, indicates that the settings for the conferences 204 should be changed to address poor QOS or other problems. The threshold 324 can be a single QOS measure or a combination of measures. For example, the threshold 324 can be a set score, such as, 8 out of 10.

One or more automated responses 326 may be stored or associated with the conference 204. The automatic responses 326 may be triggered by a crossing of the threshold 324. An automated response 326 can include a change to the conference settings 320, which would be made by the conference engine 202 in response to a threshold crossing. In other embodiments, the automated response 326 is a message sent from the MCU 106 to the endpoint 102/104 to change the endpoint's settings. In still further embodiments, the automated response 326 can include a message or signal that is sent to an administrator or other party to change or adjust the settings of the conference. Thus, the signal to the administrator may describe the problem and what components are involved in the problem. The administrator can then manual change the component settings in a manner, either determined by the administrator or suggested by the signal, to compensate for the problem. The change in settings can be through methods known in the art. These automated responses 326 may be predetermined by the user or may be automated with the system and executed by the conference engine 202.

An endpoint identifier 328 can include the IDs of the communication endpoints 102 involved in the conference 204. The communication identifiers 328 can be the same or similar to communication endpoint ID 304 such that the communication endpoints 102 described in data structure 302 can be associated with one or more conferences 204 described in data structure 316.

The conference information can be indexed. Indexing includes storing information about communications endpoints 102 and conferences 204 received from other MCUs 106. For example, a first MCU 106a can send analyzed data or other information to a second MCU 106b to store the data or information onto a network database. This additional information can be received in RTCP reports or via other proprietary signaling during the conference 204. The indexed information can include different types of settings for different communication endpoints 102 made by other MCUs 106. For example, one MCU 106a may have a certain conference setting for communication endpoint 102 used in a first conference, while a second MCU 106b may have a different conference setting for a communication endpoint 102 for a second conference. These different settings can be stored with the data structures 302 and 316. The indexed information can be used to establish the scoring algorithms 322 and/or the automated response 326.

Figure 4:
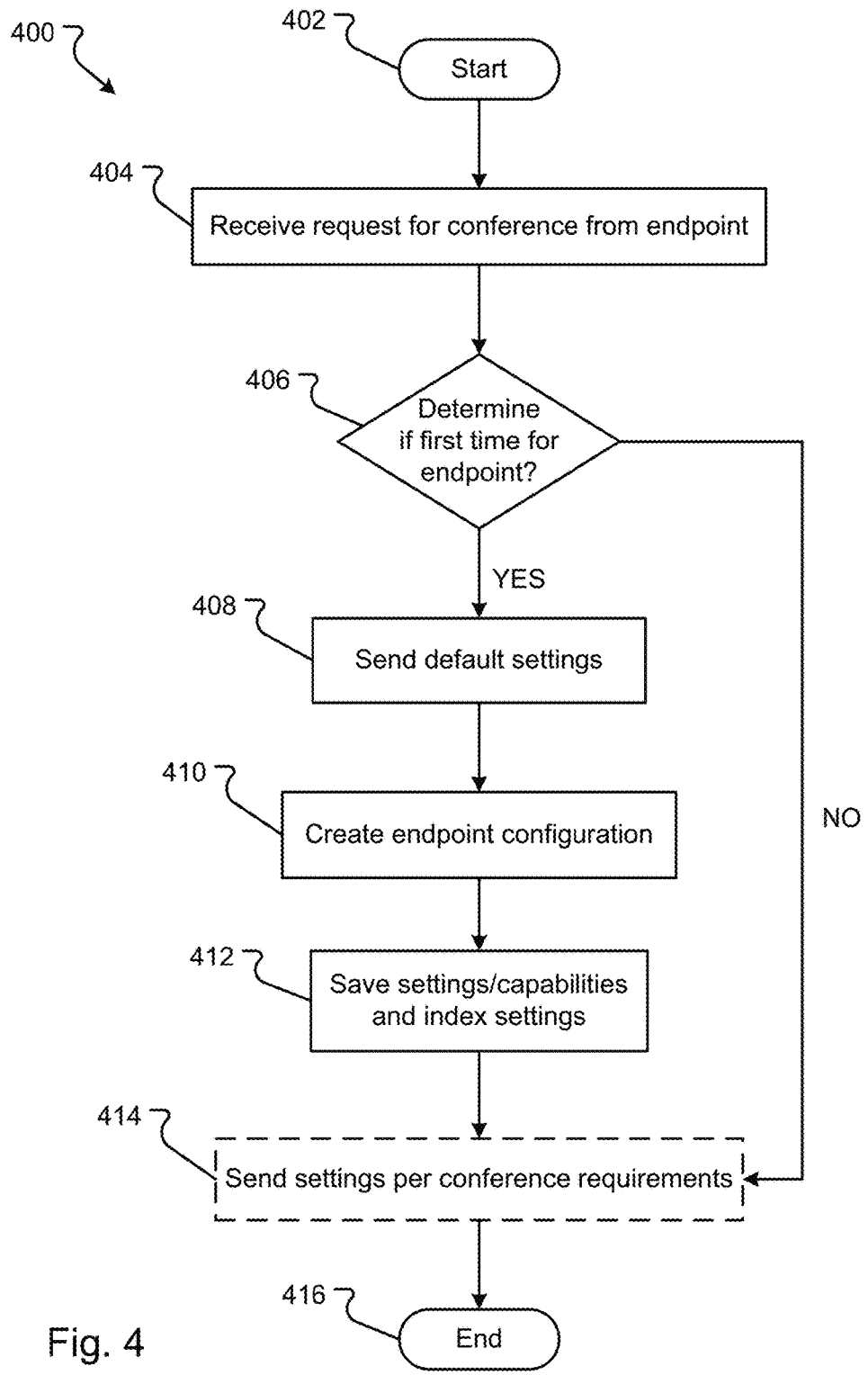
FIG. 4 is a flow diagram of an embodiment of a process for establishing settings for a conference.

An embodiment of a method 400 for automatically establishing settings for a conference is shown in FIG. 4. Generally, the method 400 begins with a start operation 402 and terminates with an end operation 416. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, data structures, user interfaces, etc. described in conjunction with FIGS. 1-3B.

An MCU 106 may receive a request for a conference 204 from a communication endpoint 102, in step 404. The communication endpoint 102 can send a conference request, using one or more communication protocols, such as SIP/H.323, through a network 110 to the MCU 106. Upon receiving the conference request, the MCU 106 can determine if this is the first time for conducting the conference 204 with communication endpoint 102, in step 406. The communication endpoint 102 may be newly created or configured and need initial settings for the conference 204. To make this determination, the MCU can search the conference settings database 212 for information about the communication endpoint 102. For example, the MCU 106 can search for the communication endpoint ID 304 (which may be received in the conference request) in the data structure 302 of the endpoint settings database 212. If no communication endpoint ID 304 is found, the MCU 106 can determine that the communication endpoint 102 has not received initial settings and has not participated in a conference 204. In alternative embodiments, the communication endpoint 102 can request settings from the MCU 106. Thus, if the MCU 106 determines that this request is the first time the communication endpoint 102 has participated in a conference 204 with the MCU 106, the method 400 proceeds YES to step 408. However, if the communication endpoint ID is discovered in the data structure 302 of the endpoint settings database 212, the method 400 proceeds NO to step 414 or to end operation 416. In alternative embodiments, if other information (e.g., communication endpoint model, type, etc.) about the communication endpoint 102 matches a similar communication endpoint 102, the method 400 proceeds NO to optional step 414 or to end operation 416.

Upon creating the data structure 302, the MCU 106 needs to send settings information for the conference 204 to the communication endpoint 102. As this is the first time the communication endpoint 102 has been involved in a conference 204, the MCU 106 can retrieve a set of default settings that may be stored in the endpoint settings database 212 to send to the communication endpoint 102, in step 408. In embodiments, the communication endpoint 102 may provide its capabilities with the capability/settings application 216 to the MCU 106. These capabilities may be sent in the conference request or may be sent in a separate data transmission to the MCU 106. Using the capabilities information, the MCU 106 can determine which settings to send to the communication endpoint 102. These settings may be transferred to the communication endpoint 102 from the MCU 106 in response to the conference request.

The MCU 106 may then create a data structure 302 associated with the communication endpoint 102 using the communication endpoint ID 102 provided in the conference request, in step 410. The endpoint configuration may also complete the other fields in the data structure 302. Thus, the conference request and capabilities information received from the communication endpoint 102 may be stored in the data structure 302. Further, the endpoint location 306 and endpoint characteristics 308 may also be stored in the data structure 302. The data structure 302 is then stored in the endpoint settings database 212.

The settings, capabilities, and any indexed settings may then be saved, in step 412. When receiving a conference request from a communication endpoint 102, the MCU 106 creates the data structure 302. However, the communication endpoint 102 can communicate with one or more other MCUs 106 during a conference. Thus, each MCU 106 can create separate and distinct data structures 302 for the endpoints 102 communicating with the MCU 106. As each communication endpoint 102 may communicate with different communication endpoints 102 during a conference 204. Thus, each MCU 106 stores information for different communication endpoints 102 in its endpoint settings database 212.

Further, these MCUs 106 may communicate with each other using RTCP reports or other proprietary signaling in which case they may receive information about a communication endpoint 102 that is communicating with the distant MCU 106. This information can be indexed in the communication endpoint data structure 302. As such, each MCU 106 may store several sections of endpoint call characteristics 310 both when the MCU 106 is directly connected to the communication endpoint 102 and when a distant MCU 106 provides information about a communication endpoint 102 connected to the distant MCU 106. In embodiments, the MCUs 106 exchange and transfer communication settings between the MCUs 106. The transferred settings for distant endpoints 102 can be normalized and merged with settings for locally connected endpoints 102. The settings from the various endpoints 102 may then be stored. This communication endpoint information can be indexed to allow the MCU 106 to build a database of call characteristics for each communication endpoint 102. Thus, as conference QOS measures change, the MCU 106 can use the index information to determine how to change the conference to respond to the communication endpoint 102. This stored information teaches and informs the MCU 106 how to provide settings to an endpoint 102 using one or more proprietary algorithms. The settings capabilities and index measures can all be stored in the data structure 302.

Optional step 414 involves the MCU 106 sending settings to the communication endpoint 102 that are specific to the conference or conference requirements. For example, an MCU 106, in a distant physical location from a communication endpoint 106, may send different requirements or settings to the communication endpoint 102 based on the physical separation. For example, a distant MCU 106 can experience packet delays that could cause QOS problems with the conference. As such, the MCU 106 can send a different codec setting to the communication endpoint 102 for the conference. The specific conference settings are stored in the conference data structure 316 and sent to the communication endpoint 102 through the network 110 by the MCU 106. Thus, with the far-end communication endpoint settings normalized and merged into the database, a consolidated conference settings database assists in establishing the conference.

Figure 5:
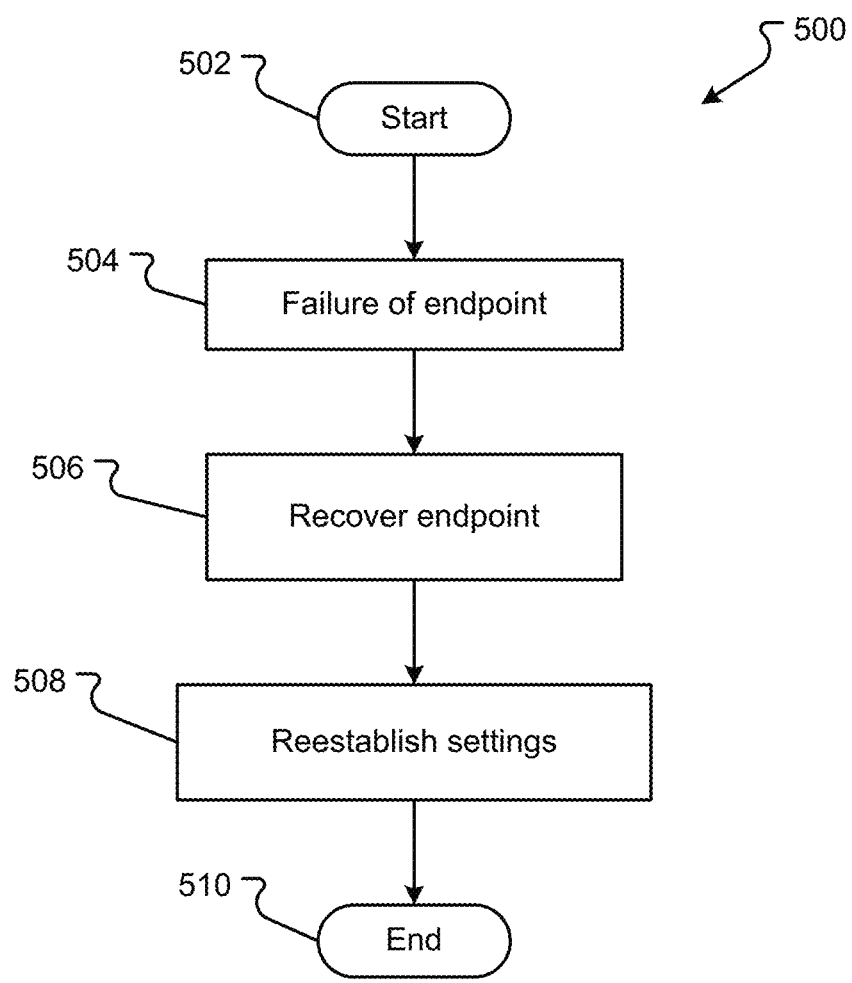
FIG. 5 is a flow diagram of an embodiment of a process for reacting to a failure during conference.

An embodiment of a method 500 for automatically recovering settings information after a failure is shown in FIG. 5. A failure can be poor QOS characteristics, the failure of one or more devices used for the conference, the inability to establish the conference, etc. Generally, the method 500 begins with a start operation 502 and terminates with an end operation 510. While a general order for the steps of the method 500 are shown in FIG. 5, the method 500 can include more or fewer steps or the order of the steps may be arranged differently than the method 500 shown in FIG. 5. The method 500 can be a set of computer-executable instructions executed by a computer system or processor and/or encoded or stored on a computer readable medium. Hereinafter, the method 500 shall be explained with reference to the systems, components, modules, data structures, user interfaces, etc. described in conjunction with FIGS. 1-3B.

During conferences, the MCU(s) 106 and the communication endpoint(s) 102 can learn about the conference settings and configurations through the receipt of the RTCP reports or other proprietary mechanism. The learned information can be used to adjust the conference or respond to problems during the conference. A communication endpoint may fail or have a conference problem, in step 504. For example, the communication endpoint 102 can lose communication (voice, video, or both), may have a hardware/software failure, or may drop out of the conference from a network error. Upon attempting to rejoin or repair the conference, the communication endpoint 102 may not have the conference settings originally sent by MCU 106 or require new settings. Thus, the communication endpoint 102 may not be able to rejoin or fix the issues associated with the conference correctly or may cause problems with the conference once the communication endpoint 102 does rejoin the conference 204.

The communication endpoint may recover, in step 506. As such, communication endpoint may resolve whatever condition caused the failure in step 504. This recovery can also include a communication endpoint re-sending a conference request to the MCU 106 to rejoin the conference. Upon recovering and re-establishing the reconnection with the conference 204, the communication endpoint 102 may then need to receive the settings again for the conference 204.

The conference settings are re-established, in step 508. In one embodiment, the communication endpoint 102 may have stored the conference settings in the capability/settings application 216 and is able to rejoin or reestablish the conference by reading and re-executing any settings saved by the capability/settings application 216. Thus, the original settings sent by the MCU 106 may be used to re-establish the communication endpoint 102 in the conference 204 upon recovery from the failure.

In another embodiment, the MCU 106 receives a second conference request from the communication endpoint 102 or determines the problem from the RTCP report or other proprietary mechanism. The conference request can include the information about the conference 204 that may be located in data structure 316. Thus, the MCU 106 may search the conference identifier 318, which may be included in the conference request, to locate the data structure 316. Upon finding the data structure 316, the MCU 106 may then send the conference settings back to the communication endpoint 102 by reading those conference settings from the conference settings 320 in the data structure 316 and re-sending a response to the conference request. Thus, the communication endpoint 102 may then re-establish connection to the conference 204 after recommitting the settings that have been resent to the communication endpoint 102.

Figure 6:
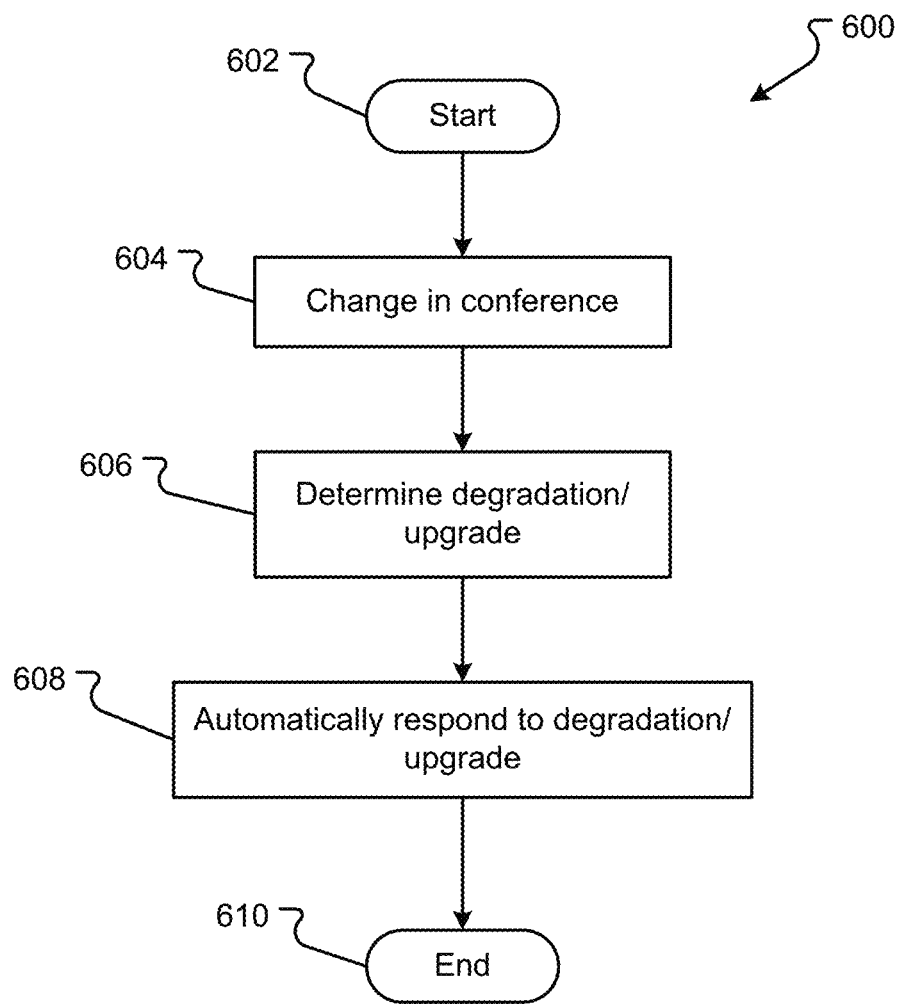
FIG. 6 is a flow diagram of an embodiment of a process for reacting to a change in a conference.

An embodiment of a method 600 for automatically adjusting to changes in the conference is shown in FIG. 6. Generally, the method 600 begins with a start operation 602 and terminates with an end operation 610. While a general order for the steps of the method 600 are shown in FIG. 6, the method 600 can include more or fewer steps or the order of the steps may be arranged differently than the method 600 shown in FIG. 6. The method 600 can be a set of computer-executable instructions executed by a computer system or processor and/or encoded or stored on a computer readable medium. Hereinafter, the method 600 shall be explained with reference to the systems, components, modules, data structures, user interfaces, etc. described in conjunction with FIGS. 1-3B.

A change in the conference may occur, in step 604. Thus a conference 204 being executed by a conference engine 202 may have a certain configuration and be established and executing. However, for circumstances either inherent in the conference or due to outside influences (such as failures in one or more pieces of equipment), the conference 204 may change either in configuration or in some other measure. The conference 204, thus, may have a drop in one or more QOS measures. In other embodiments, a manual change may be made, by an administrator or other third party, that overrides the settings of the conference.

The conference monitor 214 may measure the conference 204 and determine a degradation in (e.g., a hang or restart in the software or hardware) or an upgrade to the conference 204, in step 606. The degradation or upgrade may be in a communication endpoint 102, in the network, or in some other device or system. The conference monitor 214 may measure the QOS measures by using the scoring algorithm 322, wherein the QOS measures may be provided in a RTCP report or may be determined by another monitoring algorithm. The conference monitor 214 may compare the scores from the scoring algorithm to a threshold 324. Both the scoring and the comparison to the threshold 324 may occur periodically, such as every minute or every second of the conference 204. Thus, the conference monitor 214 can determine from the scoring algorithm and threshold 324 if there was a change in the conference. If there is a conference change, the conference monitor 214 may signal the conference engine 202 that the conference conditions have changed and a response is required.

The conference engine 202 may retrieve an automated response 326 associated with the type of the change in the conference 204 to execute in the conference 204, in step 608. The automated responses can request settings changes from the communication endpoints 102 and/or in the conference engine 202. For example, if a delay is found in the conference the conference engine 202 may send a signal to the communication endpoint 102 requiring a change in the codec or other configuration change from the communication endpoint 102.

In embodiments, the conference engine 202 can use the indexed information in data structure 302 to determine the type of change that is needed. For example, if the packet delay is between 0 and 100 mS, there may be a first codec used by a communication endpoint 102. However, if the delay is between 100 and 200 mS, a second codec may be used in the conference 204 by the communication endpoint 102. As such, if the packet delay goes beyond 100 mS, the conference engine 202 may send a new settings requirement to the communication endpoint 102 to change the codec being used. In other embodiments, the conference 204 may improve in a QOS measure and thus allow the communication endpoint 102 to use enhanced features. For example, if the packet delay goes from 105 mS down to 50 mS, the codec may be changed in order to improve the service provided to the communication endpoint 102. As such, the conference engine 202 can respond to both degradations and improvements in the conference quality or conference conditions.

Figure 7:
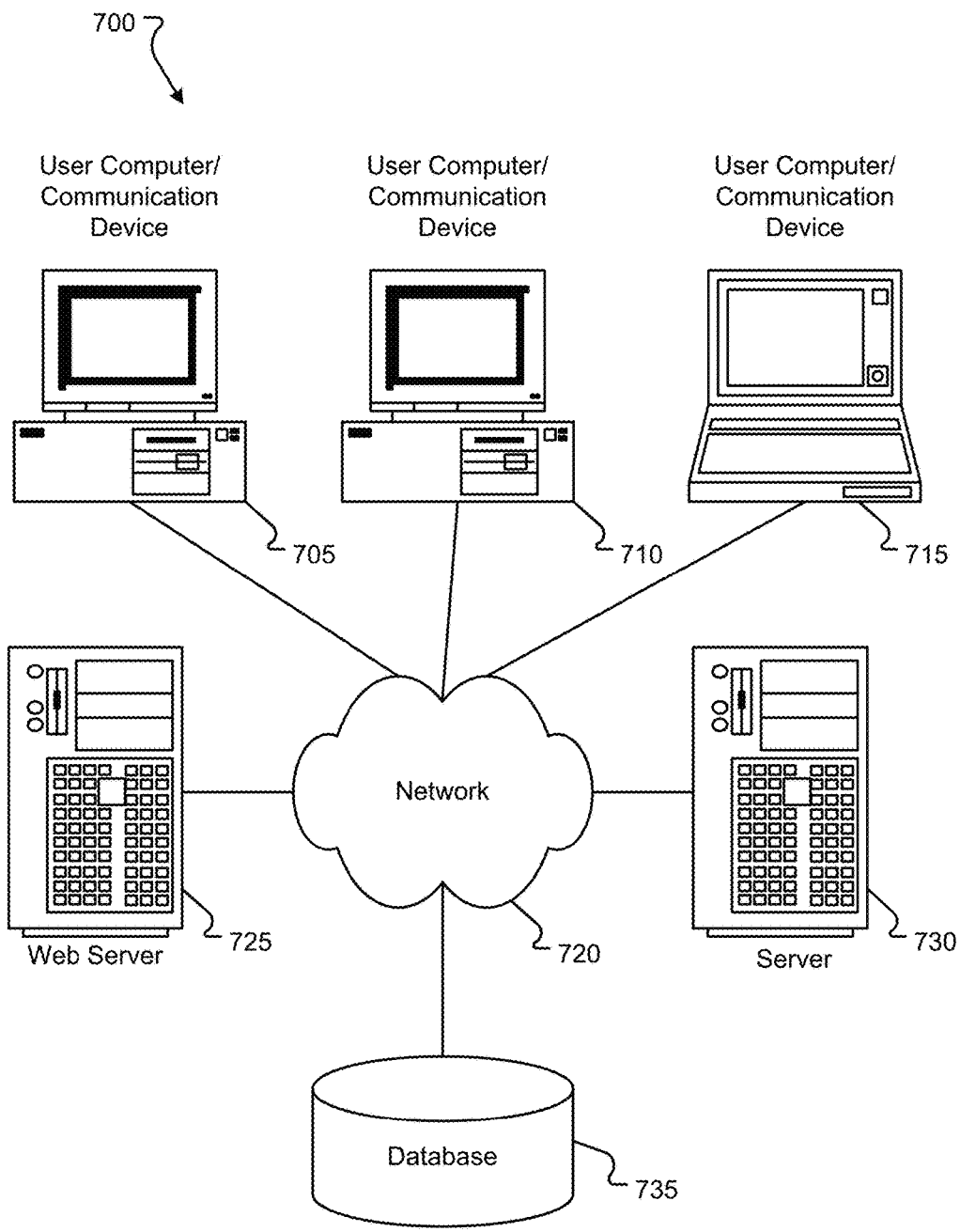
FIG. 7 is a block diagram of an embodiment of a computing environment operable to execute the embodiments described herein.

FIG. 7 illustrates a block diagram of a computing environment 700 that may function as system or environment for the embodiments described herein. The system 700 includes one or more user computers 705, 710, and 715. The user computers 705, 710, and 715 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network (e.g., the network 720 described below) and/or displaying and navigating web pages or other types of electronic documents. Although the exemplary system 700 is shown with three user computers, any number of user computers may be supported.

System 700 further includes a network 720. The network 720 can be any type of network familiar to those skilled in the art that can support data communications using any of a variety of commercially-available protocols, including, without limitation, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 700 may also include one or more server computers 725, 730. One server may be a web server 725, which may be used to process requests for web pages or other electronic documents from user computers 705, 710, and 715. The web server can be running an operating system including any of those discussed above, as well as any commercially-available server operating systems. The web server 725 can also run a variety of server applications, including HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#™ or C++, and/or any scripting language, such as Perl, Python, MySQL, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 5 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as servers or other systems described herein.

The system 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands. Database 735 may be the same or similar to the database used herein.

Figure 8:
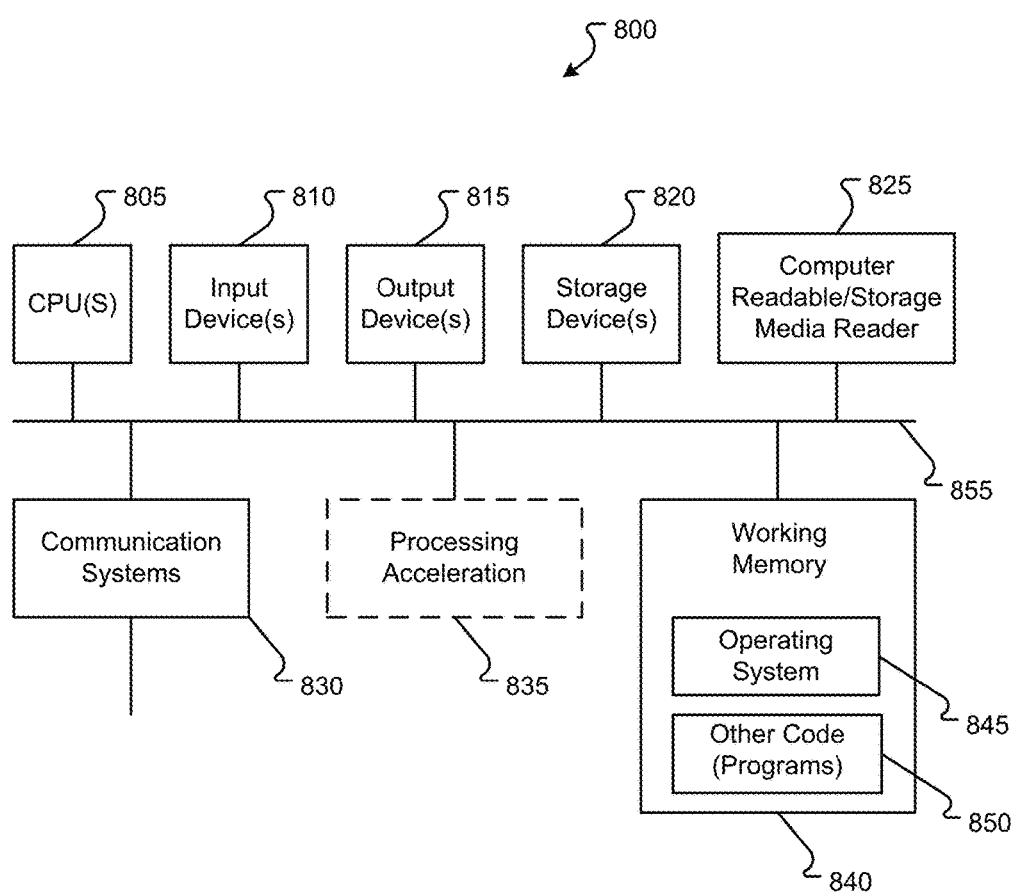
FIG. 8 is a block diagram of an embodiment of a computer or computing system environment operable to execute as the one or more devices described herein.

FIG. 8 illustrates one embodiment of a computer system 800 upon which servers or other systems described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage device 820. By way of example, storage device(s) 820 may be disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850, such as program code implementing the servers or devices described herein. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the embodiments have been described in detail herein, it is to be understood that the inventive concepts may be otherwise variously embodied and employed, and that the appended claims are intended to be construed to include such variations, except as limited by the prior art.

What is claimed is:

1. A communication system, comprising:
   a first multipoint control unit (MCU) in communication with a first communication endpoint, the first MCU comprising:
      a memory operable to store first conference settings for the first communication endpoint, wherein the first conference settings for the first communication endpoint are used by the first MCU to configure the first communication endpoint to communicate with the first MCU in the first conference;
      a processor in communication with the memory, the processor operable to execute a second conference associated with the first communication endpoint in accordance with the first conference settings, wherein the first conference settings for the first communication endpoint are used by the first MCU to configure the first communication endpoint to communicate with the first MCU in the second conference;
   a second MCU in communication with the first MCU, the second MCU comprising:
      a second memory operable to store the first conference settings for the first communication endpoint, wherein the first conference settings for the first communication endpoint are received from the first MCU;
      a second processor in communication with the second memory, the second processor operable to:
         normalize the first conference settings; and
         execute a third conference associated with the first communication endpoint in accordance with the normalized first conference settings, wherein the normalized first conference settings for the first communication endpoint are used by the second MCU to configure the first communication endpoint to communicate with the second MCU in the third conference.

2. The communication system as defined in claim 1, further comprising:
   a second communication endpoint in communication with the second MCU;
   wherein the second memory stores second conference settings for the second communication endpoint; and
   wherein the second MCU sends the second conference settings to the first MCU.

3. The communication system as defined in claim 2, wherein the second memory stores endpoint characteristics for the first communication endpoint and the second communication endpoint.

4. The communication system as defined in claim 3, wherein the second memory stores endpoint call characteristics for the first communication endpoint and the second communication endpoint.

5. The communication system as defined in claim 4, wherein the endpoint characteristics and the endpoint call characteristics are associated with the first conference settings or the second conference settings, and wherein the first conference settings are received by an RTP communication or other proprietary mechanism from the first MCU during the first conference.

6. The communication system as defined in claim 1, wherein the first conference settings for the first communication endpoint comprise a type of codec used by the first communication endpoint in the first conference.

7. The communication system as defined in claim 6, wherein the type of codec used by the first communication endpoint is one of a plurality of codecs supported by the first communication endpoint.

8. The communication system as defined in claim 1, wherein the normalized first conference settings for the first communication endpoint that are used by the second MCU to configure the first communication endpoint to communicate with the second MCU in the third conference are based on a physical separation between the first communication endpoint and the second MCU.

9. The communication system as defined in claim 1, wherein the second MCU sends the normalized first conference settings to the first communication endpoint in the third conference.

10. The communication system as defined in claim 1, wherein the normalized first conference settings for the first communication endpoint that are used by the second MCU to configure the first communication endpoint to communicate with the second MCU in the third conference comprise a different codec setting.

11. A method, comprising:
storing, by a microprocessor in a first multipoint control unit (MCU), first conference settings for a first communication endpoint, wherein the first conference settings for the first communication endpoint are used by the first MCU to configure the first communication endpoint to communicate with the first MCU in the first conference;
executing, by the microprocessor, a second conference associated with the first communication endpoint in accordance with the first conference settings, wherein the first conference settings for the first communication endpoint are used by the first MCU to configure the first communication endpoint to communicate with the first MCU in the second conference;
sending, by the microprocessor, the first conference settings for the first communication endpoint to a second MCU, wherein the second MCU normalizes the first conference settings for the first communication endpoint, wherein the second MCU executes a third conference associated with the first communication endpoint in accordance with the normalized first conference settings, wherein the normalized first conference settings for the first communication endpoint are used by the second MCU to configure the first communication endpoint to communicate with the second MCU in the third conference.

12. The method as defined in claim 11, wherein a second communication endpoint is in communication with the second MCU, wherein the second MCU stores second conference settings for the second communication endpoint, and wherein the second MCU sends the second conference settings to the first MCU.

13. The method as defined in claim 12, wherein the second MCU stores endpoint characteristics for the first communication endpoint and the second communication endpoint.

14. The method as defined in claim 13, wherein the second MCU stores endpoint call characteristics for the first communication endpoint and the second communication endpoint.

15. The method as defined in claim 14, wherein the endpoint characteristics and the endpoint call characteristics are associated with the first conference settings or the second conference settings, and wherein the first conference settings are received by an RTP communication or other proprietary mechanism from the first MCU during the first conference.

16. The communication system as defined in claim 11, wherein the first conference settings for the first communication endpoint comprise a type of codec used by the first communication endpoint in the first conference.

17. The communication system as defined in claim 16, wherein the type of codec used by the first communication endpoint is one of a plurality of codecs supported by the first communication endpoint.

18. The communication system as defined in claim 11, wherein the normalized first conference settings for the first communication endpoint that are used by the second MCU to configure the first communication endpoint to communicate with the second MCU in the third conference are based on a physical separation between the first communication endpoint and the second MCU.

19. The communication system as defined in claim 11, wherein the second MCU sends the normalized first conference settings to the first communication endpoint in the third conference.

20. The communication system as defined in claim 11, wherein the normalized first conference settings for the first communication endpoint that are used by the second MCU to configure the first communication endpoint to communicate with the second MCU in the third conference comprise a different codec setting.

* * * * *